United States Patent [19]

Takagi et al.

[11] Patent Number: 5,197,172

[45] Date of Patent: Mar. 30, 1993

[54] MACHINING SYSTEM

[75] Inventors: Masayoshi Takagi, Kariya; Takehito Aikawa, Toyokawa; Takanori Ohta, Nishio; Ryoichi Takami, Chiryu; Hiroki Osada, Nagoya, all of Japan

[73] Assignee: Toyoda Koki Kabushiki Kaisha, Kariya, Japan

[21] Appl. No.: 890,146

[22] Filed: May 29, 1992

[30] Foreign Application Priority Data

May 31, 1991 [JP] Japan .................................. 3-129710
May 31, 1991 [JP] Japan .................................. 3-157622

[51] Int. Cl.[5] ........................................... B23Q 41/08
[52] U.S. Cl. ..................................... 29/33 P; 29/564; 364/474.11; 364/474.17
[58] Field of Search ......................... 29/33 P, 564, 563; 364/474.11, 474.12, 474.17, 474.22; 483/7, 11, 14, 15

[56] References Cited

U.S. PATENT DOCUMENTS

| | | | |
|---|---|---|---|
| 4,841,431 | 6/1989 | Takagi et al. | 364/474.11 |
| 5,019,762 | 5/1991 | Kato | 483/7 |
| 5,088,045 | 2/1992 | Shimanaka | 364/474.11 |

FOREIGN PATENT DOCUMENTS 63-22253 1/1988 Japan .

Primary Examiner—William Briggs
Attorney, Agent, or Firm—Oblon, Spivak, McClelland, Maier & Neustadt

[57] ABSTRACT

A machining system comprising a plurality of different kinds of single purpose machining units arranged at plural machining stations located along a transfer path, and a transfer apparatus for transferring plural kinds of workpieces along the transfer path so as to position each of the workpieces at plural machining stations successively for machinings by the plural single purpose machining units. The machining system is provided with a return conveyor or a transfer vehicle for transferring the workpieces along a return path from the end of the transfer path to a workpiece unloading station, and a numerically controlled general purpose machine tool arranged adjacent to the return path. The general purpose machine carries out special machinings which cannot be carried out by the single purpose machining units for machining some workpieces which require such special machinings. Workpieces which do not require the special machinings are directly transferred from the end of the transfer path to the workpiece unloading station. The general purpose machine also memorizes plural numerical control programs corresponding to machinings carried by the single purpose machining units, and selectively carries out the numerical control programs when a malfunction occurs in one of the single purpose machining units.

6 Claims, 10 Drawing Sheets

| WORKPIECE NUMBER | STATION | MACHINING CYCLE |
|---|---|---|
| 2 | 3 | 3 |
| . | . | . |
| . | . | . |
| . | . | . |

EDT

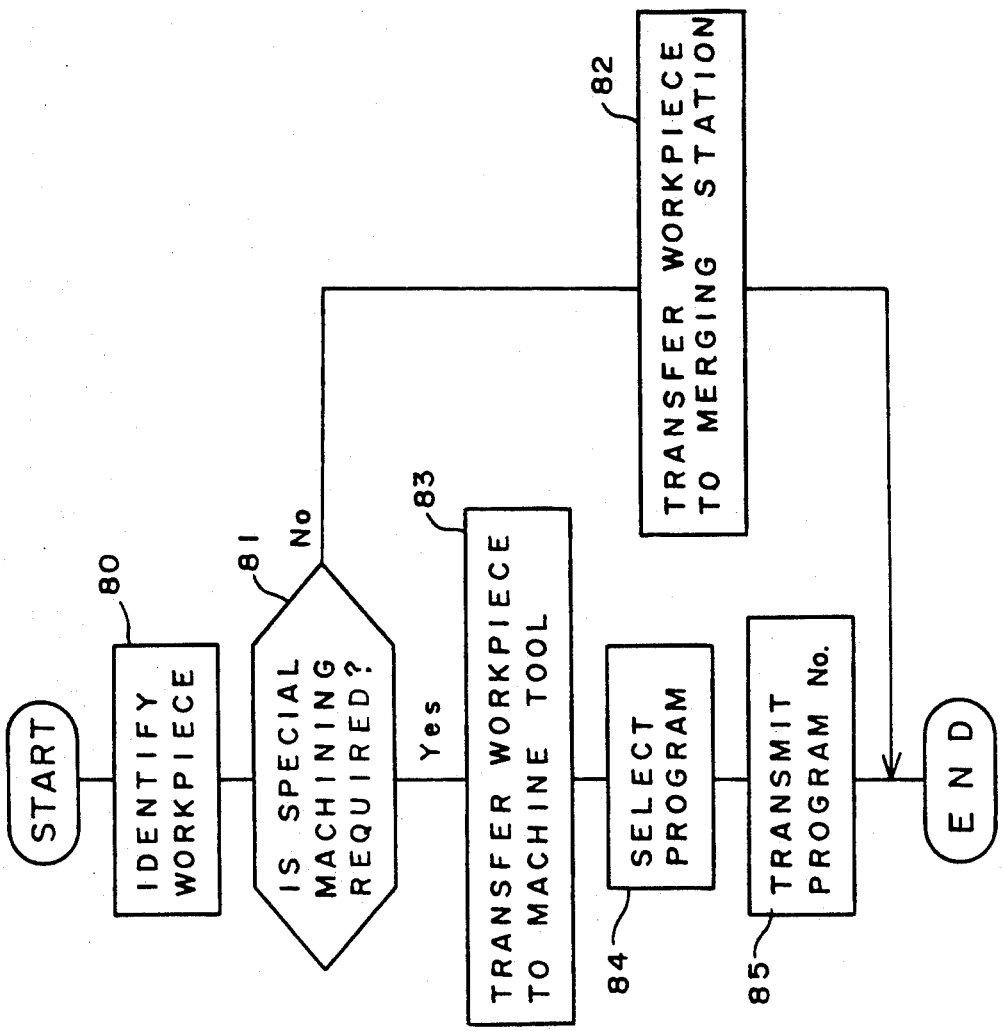

FIG. 7

|  | St. 1 | St. 2 | St. 3 | St. 4 | St. 5 | MC | MVT |
|---|---|---|---|---|---|---|---|
| Workpiece 1 | 6 | 3 | 7 | 2 | 5 | 10 | |
| Workpiece 2 | 1 | 6 | 3 | 2 | 4 | 1 | |
| Workpiece 3 | 7 | 6 | 4 | 1 | 5 | 1 | |
| Workpiece 4 | 8 | 4 | 2 | 5 | 3 | 9 | |
| Workpiece 5 | 8 | 4 | 1 | 2 | 7 | 12 | |
| ... | | | | | | | |

FIG. 8

| | | WNT |
|---|---|---|
| ADWn | 20 | |
| ADWn+1 | 2 | |
| ADWn+2 | 13 | |
| ADWn+3 | 4 | |
| ADWn+4 | 5 | |
| ADWn+5 | 15 | |
| ... | | |

FIG. 10

| WORKPIECE NUMBER | STATION | MACHINING CYCLE |
|---|---|---|
| 2 ... | 3 ... | 3 ... |

EDT

FIG. 9

|  | St. 1 | St. 2 | St. 3 | St. 4 | St. 5 | M C |
|---|---|---|---|---|---|---|
| Cycle No. 1 | 0 | 0 | 0 | 0 | 0 | 0 |
| Cycle No. 2 | 0 | 0 | 0 | 0 | 0 | 0 |
| Cycle No. 3 | 0 | 0 | 1 | 0 | 0 | 0 |
| Cycle No. 4 | 0 | 0 | 0 | 0 | 0 | 0 |
| Cycle No. 5 | 0 | 0 | 0 | 0 | 0 | 0 |
| ... | ... | ... | ... | ... | ... | ... |

SCT

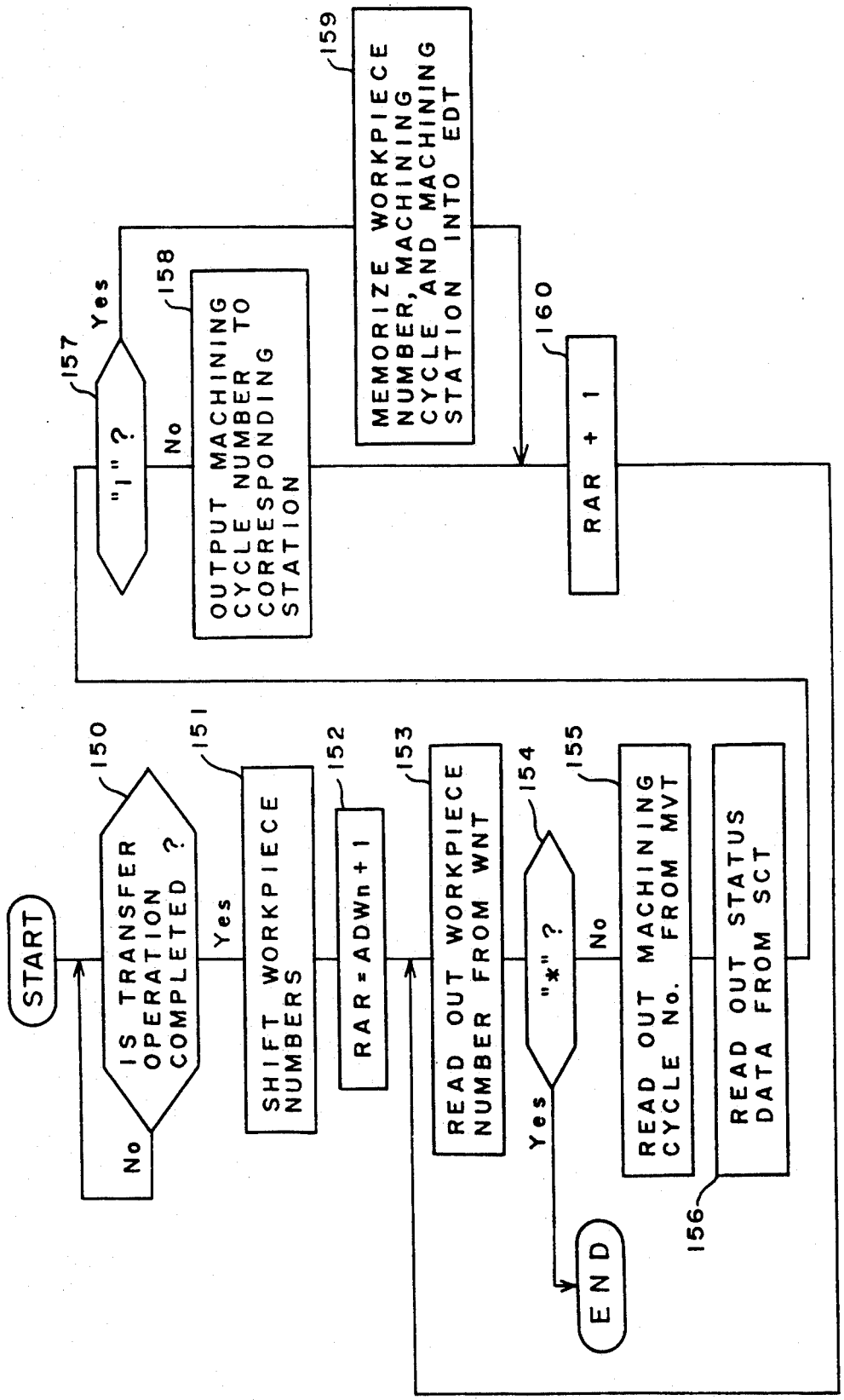

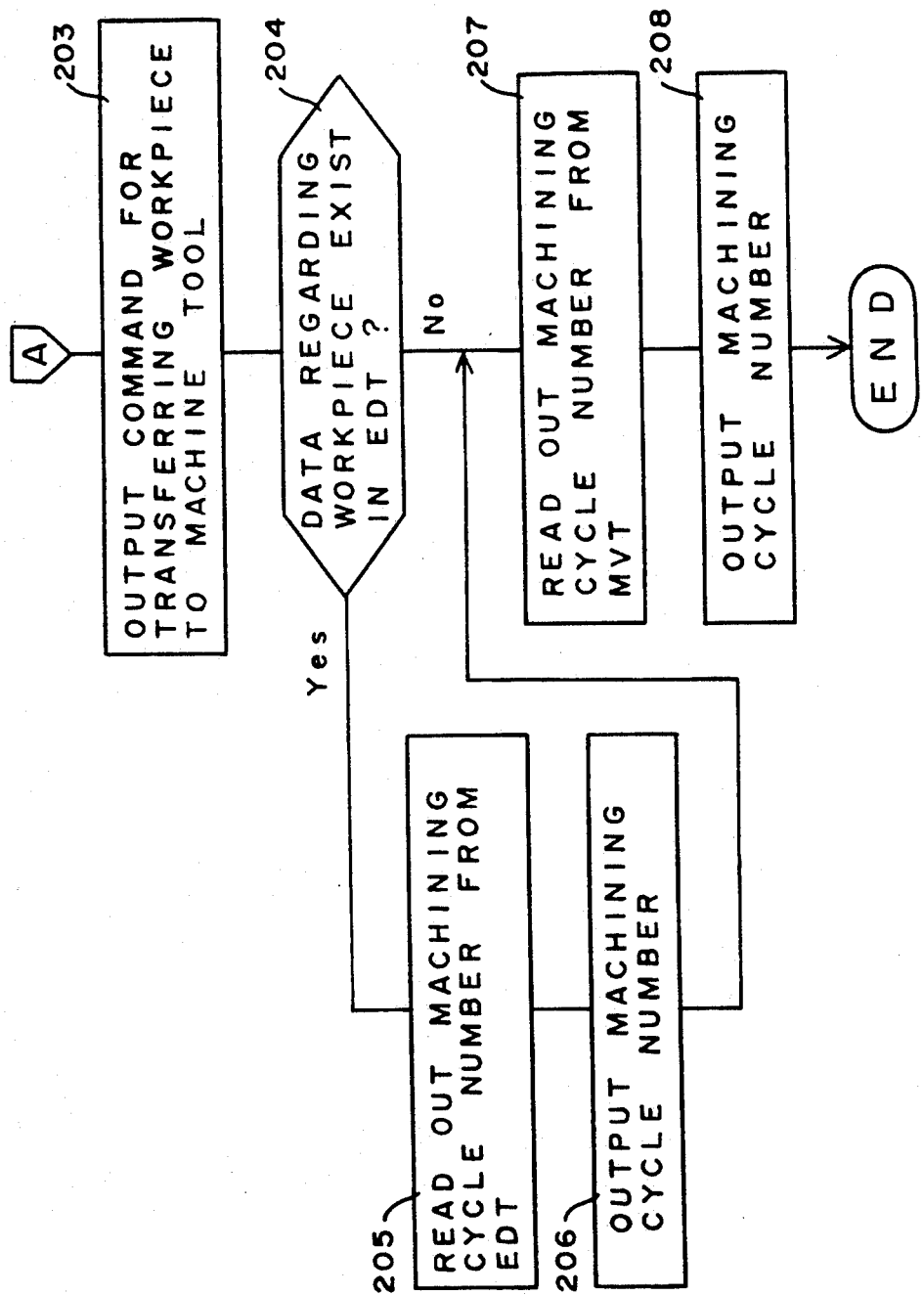

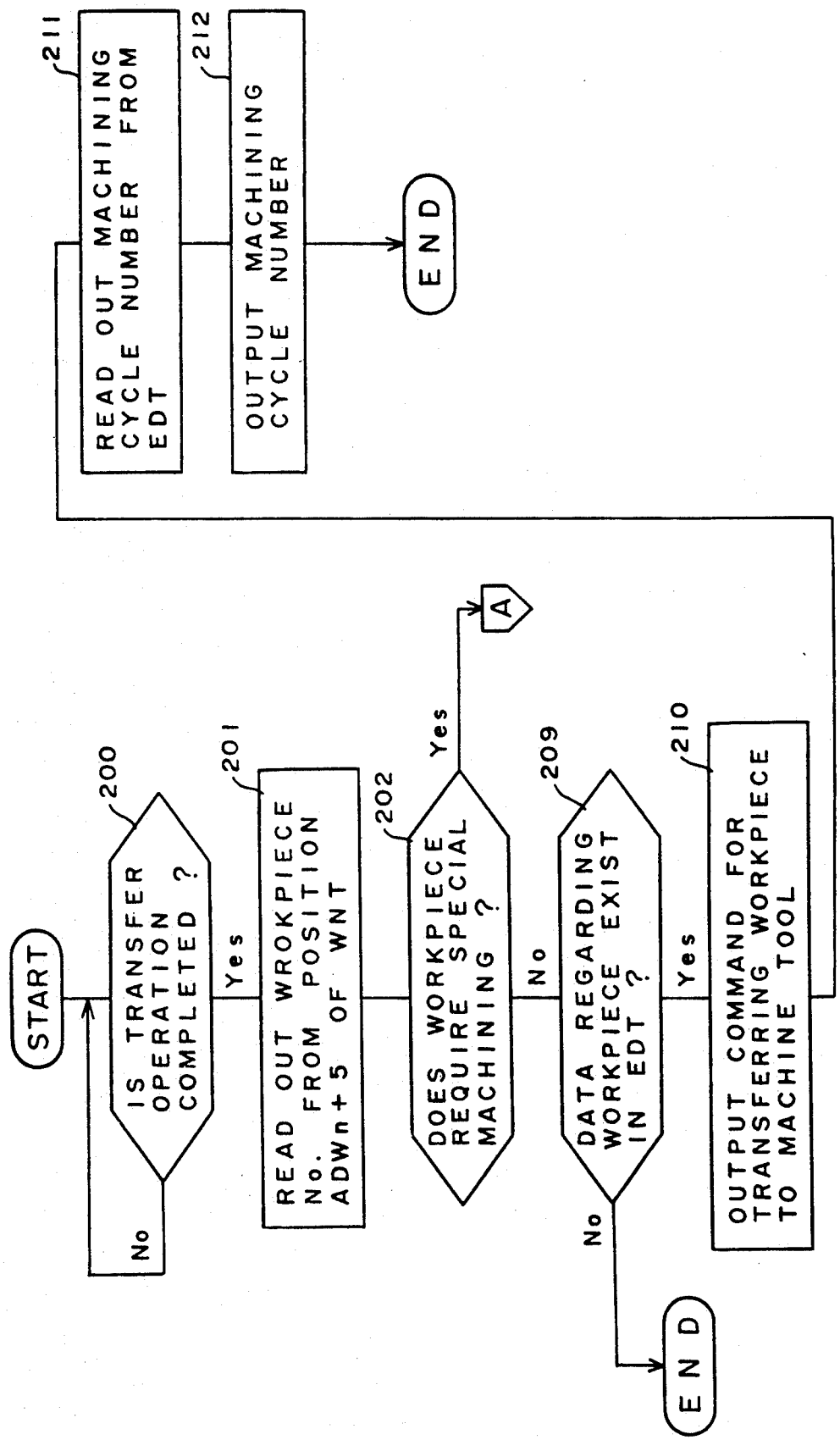

MACHINING SYSTEM

BACKGROUND OF THE INVENTION

1. Field of the Invention

This invention relates to a machining system wherein a variety of workpieces are machined by plural machining units arranged along a transfer path on which the workpieces are transferred.

2. Prior Art of the Invention

Conventionally, a transfer machine has been used for efficiently machining a large number of workpieces. As shown in FIG. 1, such transfer machine is provided with plural single purpose machining units M1-M4 which are installed at plural machining stations C1-C4 located along a transfer path on which plural pallets holding workpieces are successively transferred by a transfer apparatus 3 for machining the workpieces. Further, when some of workpieces require special machinings which cannot be carried out by the single purpose machining units M1-M4, additional special machining units M10-M12 are installed at additional machining stations S1-S3 for carrying out the special machinings. The entrance end and exit end of the transfer apparatus 3 are connected through a pallet return conveyers 2a, 2b and 2c. A workpiece exchange station E is arranged in the midway of the pallet return conveyer 2b.

In such transfer machine, its machining cycle time is determined based upon the production speed of the workpieces, and the machining at each of machining stations C1-C4 and S1-S3 must be completed within the predetermined machining cycle time. Therefore, in cases where part of workpieces require a special machining which takes very long time to complete, the special machining must be divided into plural machinings so as to make the machining time of each divided machining operation shorter than the machining cycle time. In such case, several single purpose machining units M10-M12 are installed for the special machinings, whereby the length of the transfer machine becomes long, and the installation space and installation cost of the transfer machine also increase. Especially, in cases where only small number of workpieces require such special machinings, the installation of a large number of special machining stations is not economical.

Recently, a flexible transfer machine has been developed for efficiently machining plural kinds of workpieces. In such flexible transfer machine, each single purpose machining unit is composed of a numerically controlled machining unit which is provided with a single kind of tool but memorizes plural kind of machining programs corresponding to the kinds of workpieces to be machined. The kind of a workpiece is detected at each machining station to select a machining program corresponding to the kind of the workpiece, whereby the selected machining program is executed to machine the workpiece.

Such flexible transfer machine also has problems similar to those of the above-mentioned conventional transfer machine. Even though each single purpose machining unit can store plural kinds of machining programs, the kinds of machinings are limited by the kind of tool provided in the single purpose machining unit, because each single purpose machining unit of such flexible transfer machine is provided with a single kind of tool. Therefore, when some of workpieces require special machinings which cannot be carried out by the single purpose machining units, additional single purpose machining units must be installed to carry out the special machinings. When the special machinings take long time to be carried out, the special machinings are divided into plural machinings so that each of single purpose machining units can carry out each of divided machining operations within a predetermined machining cycle time. This results in an increase of the number of additional single purpose machining units for special machinings, thereby causing an increase of the installation space and cost of the transfer machine.

Further, when a malfunction, for example, the breakage of a tool occurs in one of single purpose machining units, the production of workpieces must be stopped. This hinders the production schedule of the workpieces.

SUMMARY OF THE INVENTION

Accordingly, it is an object of the present invention to provide an improved machining system in which a plurality of single purpose machining units are combined with a single or small number of general purpose machine tools.

Another object of the present invention is to provide an improved machining system capable of machining a large number of workpieces efficiently, and also capable of machining workpieces requiring special machinings, which cannot be carried out by the single purpose machining units in the system, by a single or small number of general purpose machine tools.

Further object of the present invention is to provide an improved machining system capable of continuing the machining operation even when one of single purpose machining units falls in a condition that workpieces cannot be machined by the single purpose machining unit due to, for example, the breakage of its tool.

Briefly, a machining system according to the present invention is provided with plural single purpose machining units and at least one general purpose machine tool arranged along a transfer path along which workpieces are transferred by a transfer apparatus. The general purpose machine tool is provided with plural kinds of tools, and stores plural numerical programs corresponding to special machinings to be carried out. The transfer apparatus thereof is arranged such that only workpieces which require special machinings are transferred into the general purpose machine tools, and the rest of them are directly transferred to its workpiece unloading station, bypassing the general purpose machine tool.

With this configuration, special machinings which are not carried out by the single purpose machining units are carried out by the general purpose machine tool. Further, workpieces which do not require the special machinings are transferred directly to the unloading station. Therefore, even when the machining times of the special machinings are longer than the machining cycle time of the single purpose machining units, the special machinings can be carried out continuously by the general purpose machine tool without disturbing the transportation of workpieces which do not require the special machinings.

In another aspect of the invention, the general purpose machine tool is provided with the same plural tools as those used in plural single purpose machining units, and memorizes plural numerical control programs for carrying out plural machinings which are carried out by the single purpose machining units under the ordinary circumstances. In this arrangement, when a malfunction occurs at one of the single purpose machining units, the general purpose machine tool carries out a machining originally carried out by the single purpose machining unit.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 4 is a chart showing a program number table formed in the memory of the CPU shown in FIG. 2;

FIG. 5 is a flowchart showing the operation of the CPU shown in FIG. 2;

FIG. 7 is a chart showing a machining variety data memorizing table MVT formed in the memory of the CPU shown in FIG. 6;

FIG. 8 is a chart showing a workpiece number memorizing table WNT formed in the memory of the CPU shown in FIG. 6;

FIG. 9 is a chart showing a status memorizing table SCT formed in the memory of the CPU shown in FIG. 6;

FIG. 10 is a chart showing an error data table EDT formed in the memory of the CPU shown in FIG. 6;

FIG. 11 is a flowchart showing the operation of the CPU shown in FIG. 6 for controlling the single purpose machining units shown in FIG. 6; and FIGS. 12 (a) and 12 (b) are flowcharts showing the operation of the CPU shown in FIG. 6 for controlling the general purpose machine tool shown in FIG. 6.

DETAILED DESCRIPTION OF PREFERRED EMBODIMENT

Preferred embodiments of the present invention will now be described with reference to figures.

First Embodiment

Figure 1:
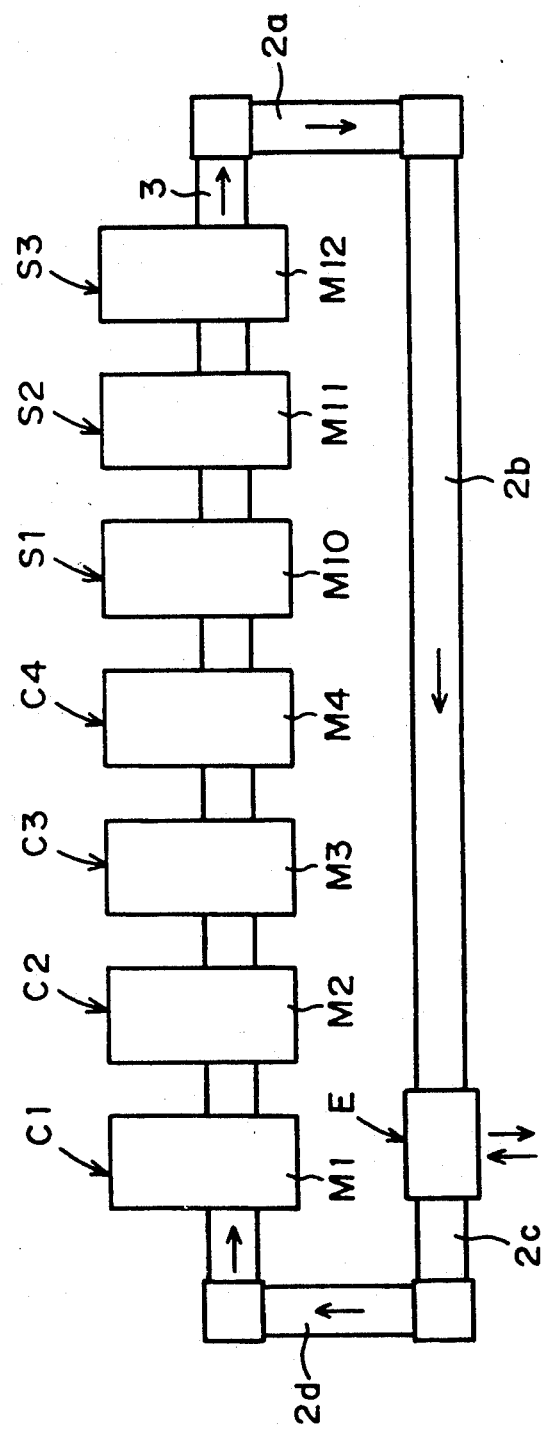
FIG. 1 is a schematic plan view of a conventional transfer machine.
Figure 2:
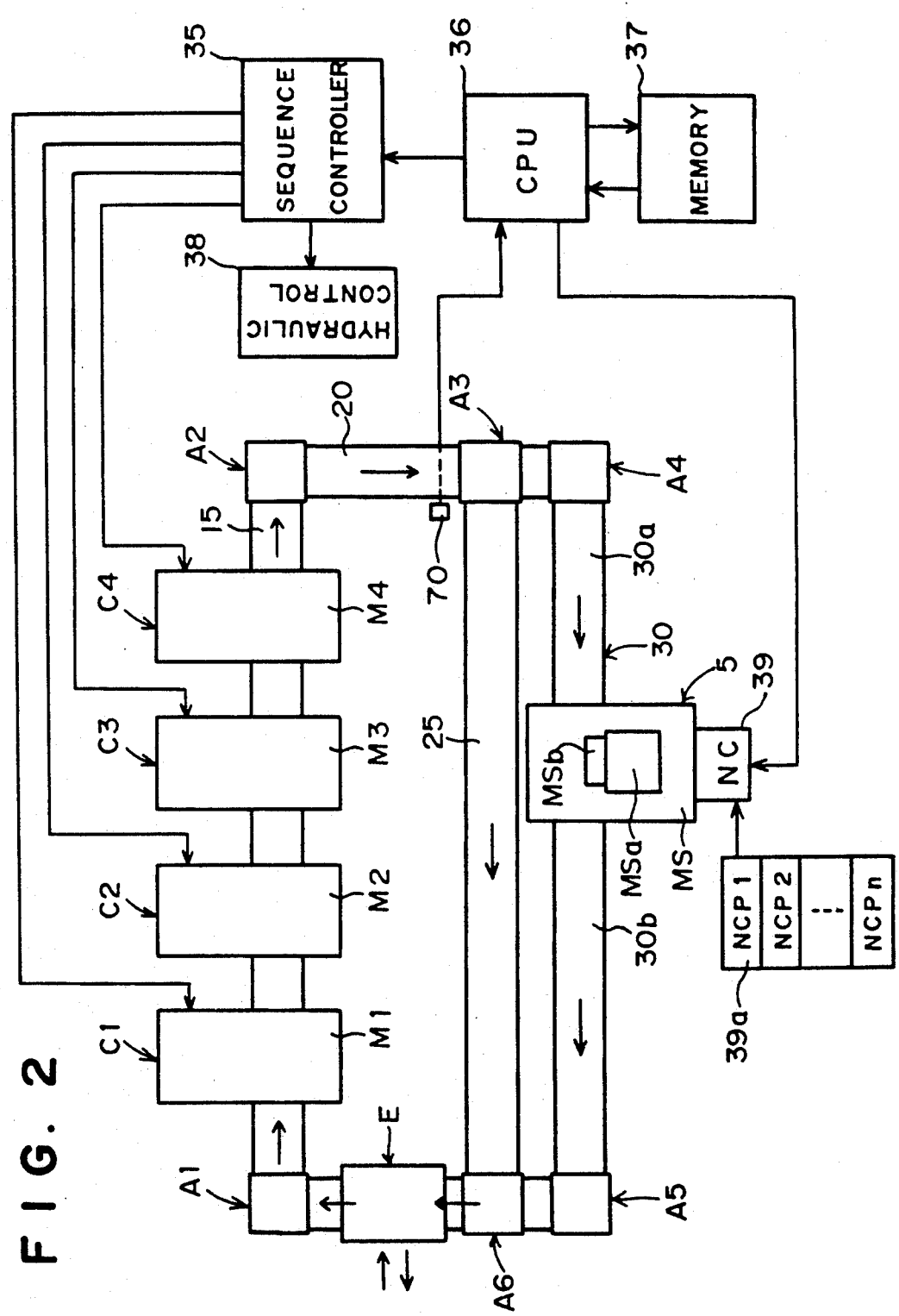
FIG. 2 is a schematic plan view of a machining system according to a first embodiment of the present invention.

In FIG. 2 illustrating a first embodiment of the present invention, there is shown a machining system which is composed of four single purpose machining units M1-M4 and one general purpose machine tool MS. The four single purpose machining units M1-M4 are installed at common machining stations C1-C4 at which all kinds of workpieces are machined. Further, a first corner station A1 and a second corner station A2 are installed at locations before and after the common machining stations C1-C4. The common machining stations C1-C4 and corner stations A1 and A2 are serially installed along a transfer path with a predetermined interval. A transfer apparatus 15 is installed along the transfer path for transferring the workpieces form the corner station A1 to the corner station A2 via the common machining stations C1-C4. A first return conveyer 25 is also installed to be parallel with the transfer apparatus 15, and one end of the first return conveyer 25 is connected to the second corner station A2 via a branch station A3 and a pallet conveyer 20 while the other end thereof is connected to the first corner station A1 via a merging station A6 and a workpiece exchange station E.

Further, a second return conveyer 30 is installed in parallel to the first return conveyer 25, and one end of the second return conveyer 30 is connected to the branch station A3 via a third corner station A4 while the other end of the second return conveyer 30 is connected to the merging station A6 via a forth corner station A5. The second return conveyer 30 is composed of a first half portion 30a and a second half portion 30b, between which a special machining station S is provided. A general purpose machine tool MS is installed at the special machining station S, and is composed of a numerical controlled machining center which is provided with a tool magazine MSa for storing plural tools and a tool changer MSb for changing tools between the tool magazine MSa and the spindle head of the machine tool MS.

Figure 3:
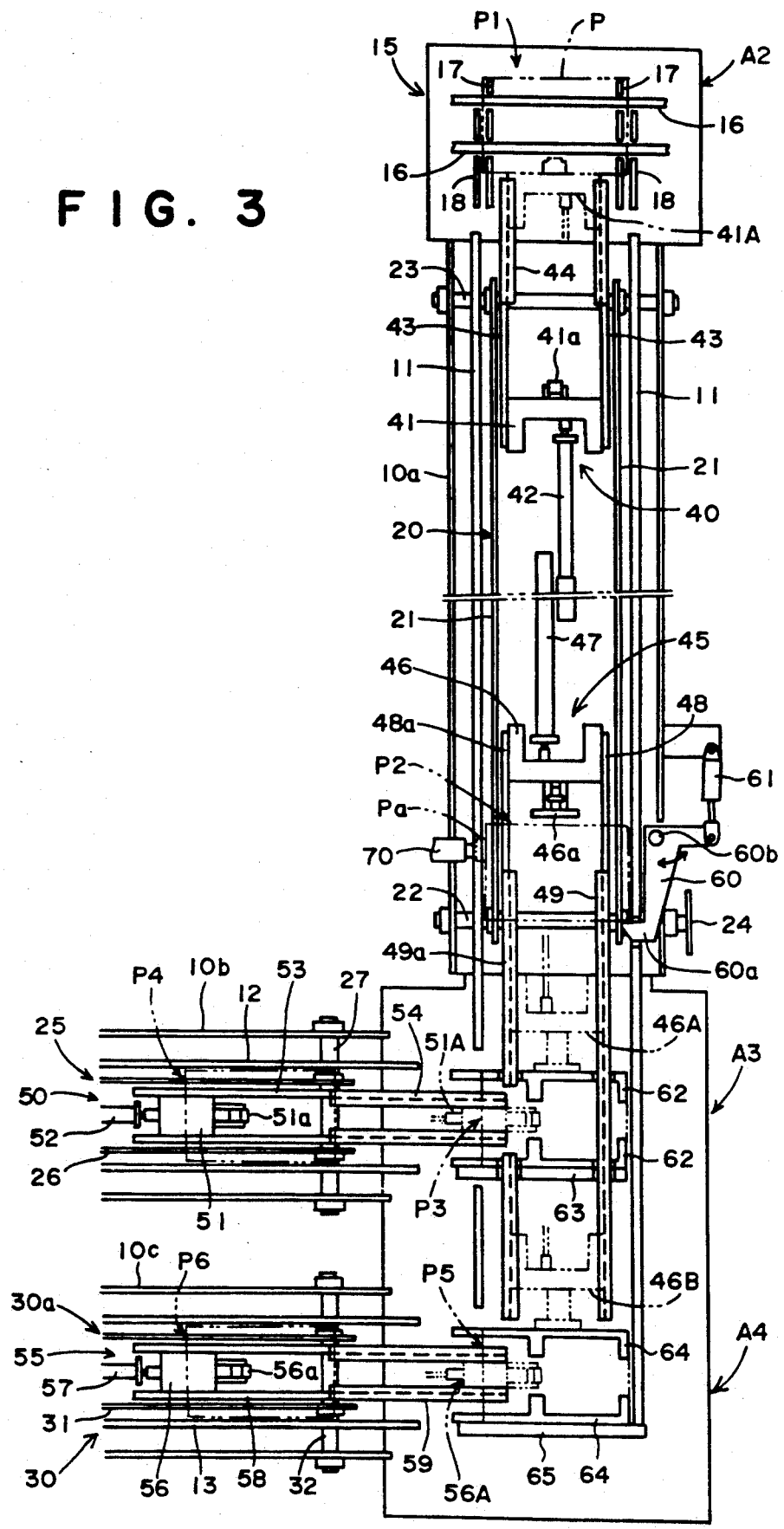
FIG. 3 is a enlarged plane view showing part of the transfer apparatus shown in FIG. 2.

The detailed structure of a pallet distribution mechanism arranged between the corner station A2 and the corner station A4 will now be described with reference to FIG. 3.

A pair of pallet supporting members 17 extending in a direction toward the branch station A3 are fixed to the second corner station A2 for supporting a pallet P on which a workpiece is held. Arranged at the both sides of the pallet supporting members 17 are a pair of guides 18 protruding upwardly with respect to the supporting surface of the pallet supporting members 17 for guiding the pallet P.

In the present embodiment, the transfer apparatus 15 is provided with a pair of transfer bars 16 of so-called lift-and-carry type. Therefore, a pallet P at the forth common machining station C4 is lifted by a upward movement of the transfer bars 16, and is then transferred to the second corner station A2. After that, the pallet P is placed on the pallet supporting members 17 at a position P1 between the pair of guides 18.

Arranged between the second corner station A2 and the branch station A3 is a machine frame 10a on which the pallet conveyer 20 is attached. The chain conveyer 20 is composed of first and second sprocket shafts 22 and 23 rotatably supported at both longitudinal ends of the machine flame 10a, and a pair of looped conveyer chains 21 are put around the first and second sprocket shafts 22 and 23 for engagement with a pair of sprocket shafts (not shown) fixed to the first and second sprocket shafts 22 and 23, respectively. When a drive sprocket 24 fixed to the first sprocket shaft 22 is rotated by a motor through a chain (both are not shown), the upper side of the conveyer chains 21 are moved in a direction toward the branch station A3, whereby a pallet P on the conveyer chains 21 is transferred toward the branch station A3. A pair of first pallet guides 11 are also fixed on the machine frame 10a so as to prevent the lateral movement of the pallet P.

Next, a pallet withdrawing apparatus 40, which withdraws a pallet P from the pallet supporting members 17 and places on the conveyer chains 21, will be described. A slider 41 is slidably supported between a pair of guide rails 43 which are attached to the machine frame 10a at locations near the second corner station A2 and extend toward the pallet supporting members 17. The slider 41 is moved between a retracted position shown by a solid line and a advanced position 41A shown by a broken line by a cylinder 42 the base portion of which is coupled to the machine frame 10a. The slider 41 is provided with an engagement claw 41a which is swingable about a horizontal axis within a predetermined angle. When the slider 41 is advanced, the engagement claw 41a is in its swung-down position so as to allow the slider 41 to get into under the pallet P located at the second corner station A2 without interfering with the pallet P. The engagement claw 41a is thereafter swung upwardly for engagement with the pallet P. After that, the slider 41 is retracted from the advanced position to the retracted position, whereby the pallet P is withdrawn from the second corner station A2 onto the conveyer chains 21. Further, each guide rail 43 is provided with a pallet supporting rail 44 covering the half of the guide rail 43 located closer to the second corner station A2 for supporting the pallet P during the withdrawal operation.

At the other end of the machine frame 10a closer to the branch station A3, there are provided a pair of guide rails 48 and 48a which extend toward the branch station A3 and the third corner station A4 and fixed to the machine frame 10a. A pair of pallet supporting rails 49 and 49a have a similar structure to that of the pallet supporting rails 44, excepting that the pallet supporting rail 49a is splitted at a location corresponding to the branch station A3. At the branch station A3, a pair of movable pallet supporting bases 62 are supported for upward and downward movements while a pair of fixed pallet supporting bases 64 are disposed at the third corner station A4. Further, a movable pallet guide 63 which is upwardly protrudable with respect to the movable pallet supporting bases 62 is arranged at a forward side of the movable pallet supporting bases 62 in the transfer direction. Similarly, a fixed pallet guide 65 protruding upwardly with respect to the fixed pallet supporting bases 64 is arranged at a forward side of the fixed pallet supporting bases 64. Further, a swingable stopper 60 is pivoted at one side of the machine frame 10a via a vertical shaft 60b for swing movement in a horizontal plane, and the stopper 60 is swung by a cylinder 61. In the condition where the stopper 60 is located its closed position as shown by the solid line in FIG. 3, the front end portion 60a of the stopper 60 is engageable with a pallet P which is transferred by the conveyer chains 21. The stopper 60 stops the pallet P at a temporally stop position P2 under the condition that part of the bottom surface of the pallet P is supported by the pallet supporting rails 49 and 49a. At a position corresponding to the temporary stop position P2, a workpiece identifying sensor 70 is disposed so as to read a workpiece identification tag Pa which is attached to the pallet P.

A push-out apparatus 45 adjacent to the branch station A3 will now be described. A slider 46 is slidably supported between the pair of guide rails 48 and 48a. The slider 41 is coupled with a piston rod of a double stroke cylinder 47 whose base end is couple to the machine frame 10a. When the double stroke cylinder 47 is in its contracted state, the slider 46 is located at its retracted position shown by a solid line in FIG. 3. When the cylinder 47 is in the first extension state or the second extension state, the slider 46 is located at a first advanced position 46A or a second advanced position 46B as shown by broken lines in FIG. 3. The slider 46 is provided with an engagement claw 41a similar to the engagement claw 41a. When the slider 46 is advanced, the engagement claw 46a is engaged with the pallet P to push out the pallet P from the temporary stop position P2 to a first stop position P3 on the movable pallet supporting base 62, or to a second stop position P5 on the fixed pallet supporting base 64. It is to be noted that the stopper 60 has been swung outwardly before such push out operation for preventing the pallet P from interfering with the stopper 60 during the push out operation.

Further, a machine frame 10b is installed at a position adjacent to the branch station A3 and extends from the branch station in a direction perpendicular to the guide rails 48 and 48a to be parallel to the transfer apparatus 15. On the machine frame 10b, the return conveyer 25 is constructed. At each of the longitudinal ends of the machine frame 10b, a sprocket shaft 27 is rotatably supported (only one sprocket shaft located at one end is shown), and a pair of conveyer chains 26 are put around the pair of sprockets fixed to the sprocket shaft 27. The conveyer chains 26 are moved by a motor (not shown) in a similar way to that of the conveyer chains 21, whereby a pallet P supported thereon is transferred to the merging station A6. A pair of second pallet guides 12 are also attached to the machine frame 10b at both lateral sides of the conveyer chains 26.

A pallet withdrawing apparatus 50 is also provided for withdrawing a pallet P supported on the movable pallet supporting base 62 and for placing the pallet P on the conveyer chains 26. The pallet withdrawing apparatus 50 has the same structure as that of the pallet withdrawing apparatus 40. A slider 51 is slidably supported between a pair of guide rails 53, and is moved between its retracted position indicated by a solid line and its advanced position 51A indicated by a broken line. An engagement claw 51a provided at the forward end of the slider 51 is engaged with the pallet P located at the first stop position P3 when the slider 51 is located at the advanced position, and the pallet P is then withdrawn to a position P4 at which the pallet P is supported by the conveyer chains 26. Arranged between the opposite end of the conveyer chains 26 and the merging station A6 are a pallet push-out apparatus (single stroke type) same as the pallet push-out apparatus 45 and a stopper apparatus same as the stopper 60.

At a location adjacent to the third corner station A4, the first half portion 30a of the second return conveyer 30 is installed to be parallel to the first return conveyer 25. Further, a pallet withdrawing apparatus 55 is installed. Since the structure of the pallet withdrawing apparatus 55 is the same as that of the pallet withdrawing apparatus 50, elements thereof are indicated by numerals which are obtained by the addition of five to corresponding numerals of respective elements of the apparatus 50, and the detailed explanation thereof will be omitted. Between the opposite side of the first half portion 30a of the second return conveyer 30 and the special machining station S, there are provided a pallet push-out apparatus same as the pallet push-out apparatus 45 and a stopper apparatus same as the stopper 60. With this construction, a pallet P transferred to the first half portion 30a is stopped by the stopper apparatus in cases where a previous workpiece is being machined in the general purpose machine tool MS.

The second half portion 30b of the second return conveyer 30 has the same structure as that of the first half portion 30a. A pallet withdrawing apparatus same as the pallet withdrawing apparatus 55 is arranged between the one end of the second half portion 30b and the general purpose machine tool MS, while a pallet push-out apparatus (single stroke) similar to the push-out apparatus 45 (single stroke) and a stopper apparatus same as the stopper apparatus 60 are arranged between the other end of the second half portion 30b and the forth corner station A5. With this construction, a pallet P holding a machined workpiece is withdrawn from the general purpose machine tool MS and is transferred to the forth corner station A5. At stations A5, A6, E and A1, pallet push-out apparatuses similar to the pallet push-out apparatus 45 are installed.

Next, the structure of a controller system will now be described with reference to FIGS. 2, 4 and 5.

The operations of single purpose machining units M1-M4 are controlled by a programmable sequence controller 35, while the general purpose machine tool MS is controlled by a numerical controller 39. The sequence controller 35 also controls the operation of the transfer apparatus 15, pallet withdrawing apparatus 40, 50, 55 and pallet push-out apparatuses 45 via a hydraulic control circuit 38. The numerical controller 39 is provided with a memory 39a in which plural numerical control programs NCP1-NCPn are stored. The numerical control programs correspond to special machinings to be carried out at the general purpose machine tool MS.

A numeral 36 indicates a CPU supervising the sequence controller 35 and the numerical controller 39 which are connected to the CPU 36. The workpiece identifying sensor 70 is also connected to the CPU 36. The CPU 36 is provided with a memory 37 in which a program number table PNT is formed. As shown in FIG. 4, identification numbers of workpieces which require special machinings and program numbers of numerical control programs corresponding to the special machinings are memorized in the program number table PNT in advance.

The overall operation of the machining system will now be explained. Pallets P on which various workpieces are attached are successively transferred from the workpiece exchange station E to the common machining stations C1-C4. Most of the workpieces complete their required machinings at the common machining stations c1-C4, while part of workpieces requires special machinings which can be carried out by the general purpose machine tool MS only.

Firstly, a pallet P holding a new workpiece to be machined is transferred form the workpiece exchange station E to the first corner station A1, and then transferred successively to the common machining stations C1-C4 for machinings by the single purpose machining units M1-M4. After that, the pallet P is transferred to the second corner station A2 to be placed on the pallet supporting members 17. The pallet P on the pallet supporting members 17 is further transferred to the temporary stop station P2 by the pallet withdrawing apparatus 40 and the pallet conveyer 20. At the temporary stop station P2, the workpiece identification tag Pa of the pallet P is read out by the workpiece identifying sensor 70 so that a signal indicating the workpiece number is transmitted to the CPU 36. In response to the signal, the CPU 36 starts execution of the processing shown in FIG. 5. At first step 80, the signal indicating the workpiece number is read, and it is judged at step 81 whether or not the workpiece identified by the workpiece number requires any special machining. When the workpiece does not requires any special machining, the processing moves from 81 to step 82 at which a first control signal requesting the bypass transferring operation is output to the sequence controller 35. On the contrary, when the workpiece requires a special machining, the processing moves from 81 to step 83 a second control signal requesting the non-bypass transferring operation. At step 84, a specific program number is read out from the program number table PNT depending upon the workpiece number, and the read out program number is transmitted to the numerical controller 39.

After such processing, the cylinder 61 is actuated in response to a command signal from the sequence controller 35 whereby the stopper 60 is swung outwardly. When the second control signal is output from the CPU 36, the pallet P is transferred from the temporary stop station P2 to the third corner station A4 by a full extension of the cylinder 47. On the other hand, when the first signal is output from the CPU 36, the pallet P is transferred from the temporary stop station A2 to the branch station A3 by a half extension of the cylinder 47. The movable pallet supporting base 62 and movable pallet guide 63 is moved downwardly before the above mentioned transferring operation.

In the event that the pallet P is transferred to the third corner station A4, the sequence controller 35 activates the pallet withdrawing apparatus 55 and the first half portion 30a of the second return conveyer 30, thereby transferring the pallet P from the third corner station A4 to the special machining station S. After that, the numerical controller 39 reads out from the memory 36a a numerical control program designated by the program number output by the CPU 36. With this operation, the numerical control program required to carry out a special machining on the transferred workpiece is selected. After that the general purpose machine tool MS carries out the special machining on the transferred workpiece in accordance with the selected numerical control program. After the completion of the special machining, the sequence controller 35 activates the second half portion 30b of the second return converyer 30, and pallet withdrawing apparatus and pallet push-out apparatus which are arranged at locations before and after the second half portion 30b, whereby the pallet P holding the machined workpiece is transferred to the fourth corner station A5, and is then transferred to the merging station A6.

On the contrary, in the event that the pallet P is transferred to the branch station A3, the movable pallet supporting base 62 and movable pallet guide 63 are located at their upward positions. The sequence controller 35 activates the pallet withdrawing apparatus 50 and the return conveyer 25, whereby the pallet P is transferred from the branch station A3 to the merging station A6. With this operation, workpieces which do not require special machinings are directly transferred to the merging station A6 even when a specific workpiece is being machined at the general purpose machine tool MS. Accordingly, the machining cycle time of the single purpose machining units M1-M4 can be determined independently of the machining cycle time at the general purpose machine MS. A pallet P holding the machined workpiece and located at the merging station A6 is then transferred to the workpiece exchange station E at which the machined workpiece is detached from the pallet P and a new workpiece is attached to the pallet P. The pallet holding the new workpiece is then transferred to the first corner station A1 to be machined by the single purpose machining units M1-M4.

Although only one general purpose machine tool is used for carrying out special machinings, two or more machine tools may be installed for that purpose.

Second Embodiment

The second embodiment of the present invention will be now explained with reference to FIGS. 6-12 (b).

Figure 6:
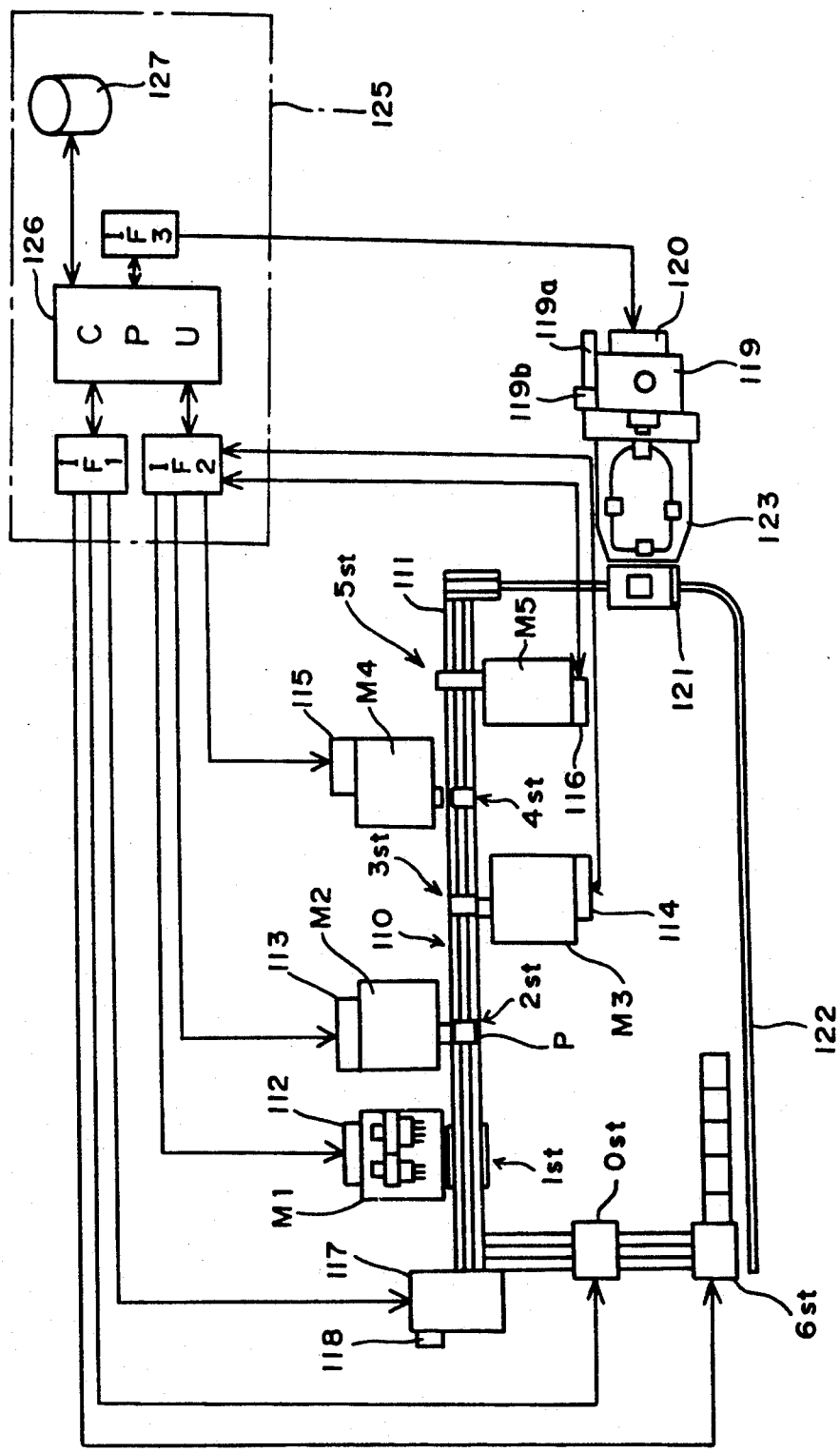
FIG. 6 is a schematic plan view of a machining system according to a second embodiment of the present invention.

In FIG. 6, a numeral 110 denotes a transfer path on which pallets P holding workpieces are transferred by a transfer apparatus 111, and along which plural stations 0st-6st are provided. The stations 1st-5st are machining stations, the station 0st is a loading station, and the station 6st is an unloading station.

Plural single purpose machining units M1-M5 are installed at locations corresponding to the plural machining stations 1st-5st, respectively. The single purpose machining units M1-M5 are connected to plural programmable sequence controllers 112-116, respectively. Each of the sequence controllers 112-116 stores plural sequence programs corresponding to plural different machining cycles, and selectively executes the plural sequence programs. By selective execution of different machining cycles, the machining head is advanced to one of different advanced positions, or one of plural machining heads is selectively advanced in cases where plural machining heads are provided in the machining unit.

Further, a numeral 117 denotes a sequence controller for controlling the operation of the transferring apparatus 111. Attached to the sequence controller 117 is a workpiece number setting device 118 for setting the workpiece number of a workpiece which has been mounted on a pallet P at the loading station 0st.

A numeral 119 denotes a general purpose machine tool which is provided with a tool magazine 119a for storing various kinds of tools and a tool changer 119b for changing tools between the tool magazine 119a and the spindle head of the machine tool 119. The tools include tools same as those of the single purpose machining units M1-M5 and tools necessary for carrying out plural special machinings. The machine tool 119 is controlled by a numerical controller 120 which is provided with a memory (not shown) in which plural numerical control programs are stored which correspond to the machining cycles carried out by the single purpose machining units M1-M5 and special machinings which are not carried out by the single purpose machining units M1-M5.

Connected to the end of the transfer path 110 is one end of a transfer rail 122 which extends along a return path for guiding a transfer vehicle 121 which transfers pallets P. The other end of the transfer rail 122 is terminated at the unloading station 6st, while the general purpose machine tool 119 is installed at a position adjacent to the transfer rail 122. Between the machine tool 119 and the transfer rail 122, a pallet changer 123 is installed for transferring pallet P between the transfer vehicle 121 and the machine tool 119.

The sequence controller 112-117 and numerical controller 120 are connected to a center controller 125, which is composed of a CPU 126, a memory 127 and interfaces IF1-IF3, and which supervises the transfer apparatus 111, single purpose machining units M1-M5, machine tool 119 and transfer vehicle 121.

Formed in the memory 27 are a machining variety data memorizing table MVT memorizing the kinds of machinings which are required to machine each of plural kinds of workpieces by the single purpose machining units M1-M5 and machine tool 119; a workpiece memorizing table WNT memorizing the workpiece numbers of workpieces located at the machining stations 1st-5st and in the machine tool 119; a status memorizing table SCT memorizing data indicating whether or not each machining unit can carry out respective machining cycles; and an error data table EDT memorizing data indicating the detail of a malfunction occurred at machining stations 1st-5st.

In the machining variety memorizing table MVT, the kinds of machinings (machining cycles) to be carried out at machining stations 1st-5st, respectively, are memorized for each kind of workpieces, as shown in FIG. 7. The workpiece memorizing table WNT is composed of plural memory positions ADWn-ADWn+6 whose total number is equal to the total number of the machining stations 1st-5st and the machine tool 119, and which memorizes the workpiece numbers of workpieces located at the machining stations 1st-5st and in the machine tool 119. The workpiece numbers memorized in the memory positions ADWn-ADWn+6 are shifted to respective adjacent memory positions in response to the transfer of pallets P.

In the status memory table SCT, information indicating whether or not each of the single purpose machining units M1-M5 can carry out the respective machining cycles. "0" are written in memory locations corresponding to plural machining cycles MC1-MC5 which can be carried out by the respective single purpose machining units MC1-MC5. In the event that "1" is written, it means that a particular machining cycle cannot be carried out. For example, when "1" is written in a memory location located in a row corresponding to the machining cycle No. 3 and in a column corresponding to the machining station 3st, as shown in FIG. 9, it indicates that the single purpose machining unit M3 at the machining station 3st cannot carry out its third machining cycle. In the error data table EDT, data indicating a machining station, workpiece number and machining cycle are memorized, as shown in FIG. 10 when a malfunction occurs.

The overall operation of the machining system will now be described. When a new workpiece is attached to a pallet P located at the loading station 0st, an operator inputs the workpiece number of the new workpiece into the workpiece number setting device 118. In response to the input of the workpiece number, the CPU 126 reads the workpiece number to store the workpiece number in the memory position ADWn of the workpiece memory table WNT.

When one the single purpose machining units M1-M5 falls in the condition that the single purpose machining unit cannot carry out a particular machining cycle, for example, due to the breakage of a tool, the numeral "1" indicating the impossibility of execution of the particular machining cycle is written in a memory position corresponding to the particular machining cycle of the single purpose machining unit. In cases where the impossibility of the execution of the machining cycle make the following machining operations impossible, "1" is written in the memory positions corresponding to machining cycles for the following machining operations.

The CPU 126 executes the processing sown by the flowcharts in FIGS. 11, 12 (a) and 12 (b) at a predetermined time interval. FIG. 11 shows a processing for controlling the single purpose machining units M1-M4 while FIG. 12 shows a processing for controlling the machine tool 119.

At first step of FIG. 11, it is judged whether or not the transfer of workpieces to adjacent stations is completed. When the transfer of workpieces is completed, the processing moves from step 150 to step 151 at which workpiece numbers memorized in the memory positions ADWn-ADWn+5 which indicating the kinds of workpieces located at loading station 0st, machining station 1st-5st, and in the machine tool 119 are shifted to adjacent memory positions ADWn+1-ADWn+6, respectively.

After this operation, the CPU 126 set the address of the memory position ADWn+1 into an address resistor RAR as an initial value, at step 152. At next step 153, the workpiece number is read out from a memory position designated by the address resistor RAR. With this operation, the workpiece number "2" is read out from the memory position ADWn+1 as the workpiece number of a workpiece located at the machining station 1st. At step 154, it is judged whether or not the read out data from the designated memory position is an end mark "*" indicating the end of the table WNT. Since the read out data is not the end mark in this case, the processing moves from step 154 to step 155, at which the CPU 126 accesses the machining variety memorizing table MVT to read out a machining cycle number indicating a machining cycle for machining a workpiece located at machining station 1st. In this case, "1" is read as the machining cycle number. At next step 156, status data, which indicates whether or not the single purpose machining unit M1 at the machining station 1st can carry out the machining cycle No. 1, is read out from the status memorizing table SCT, and it is judged at step 157 whether or not the read out status data is "1".

When the status data read out from the status memorizing table SCT is "0" which indicates that the machining cycle can be carried out, the processing moves form step 157 to step 158. In the contrary, when the status data read out from the status memorizing table SCT is "1" which indicates that the machining cycle cannot be carried out, the processing moves form step 157 to step 159.

In this instance, the workpiece whose workpiece number is "2" is located at the machining station 1st, and the machining cycle No. 1 is required to be carried out at the machining station 1st for the workpiece. Since the machining cycle No. 1 can be carried out at the machining station 1st, as is understood from the status memorizing table SCT, the processing moves from step 157 to step 158 at which data indicating the machining cycle number read out st step 155 is output to a sequence controller 112 of the machining station 1st. After that, the content of the address register RAR is incremented by one, at step 160, to renew the read out address of the workpiece memorizing table WNT, and the processing then moves back to step 153.

In cases where the data read at step 156 is "1" which indicates that the machining cycle cannot be carried out, the processing moves form step 157 to step 159. For example, when the workpiece No. 2 is transferred to the machining station 3st, it is decided that a machining for the workpiece No. 2 cannot be carried out, because the workpiece No. 2 is required to be machined by the machining cycle 3 at the machining station 3st, and "1" is stored at the memory location corresponding to the machining station 3st and the machining cycle 3 in the status memorizing table SCT. In such case, the processing moves to step 159 at which data indicating the workpiece number, machining station and machining cycle are stored in the error data table EDT, as shown in FIG. 10.

The processing at steps 153 through 160 are repeated so that data indicating the machining cycles by which workpieces at the machining stations 1st-5st are machined are output to the sequence controllers 112-116. Also, when one of single purpose machining units M1-M5 at the machining stations 1st-5st falls in a condition that the single purpose machining unit cannot carry out one of machining cycles, the above-mentioned error data are written in the error data table EDT.

The processing illustrated by the flowcharts shown in FIGS. 12 (a) and 12 (b) will now be described. The processing is for controlling the machining operation by the machine tool 119. At first step 200, it is judged whether or not the transfer of workpieces at machining stations 1st-5st has been completed. When the completion of the transfer operation is detected at step 200 processing moves from step 200 to step 201. By the transfer operation, the workpiece originally located at the machining station 5st is transferred to the exit of the transfer path 110. At step 201, a the workpiece number is read from the memory position ADWn+5 of the workpiece memorizing table WNT, and it is then judged at step 202 whether or not the workpiece designated by the workpiece number requires to be machined by the machine tool 119. As shown in FIG. 7, workpiece No. 1, 4, 5 etc. are required to be machined by the machine tool 119. When the workpiece designated by the read out workpiece number requires to be machined by the machine tool 119, the processing moves to step 203 of FIG. 12 (b). When the workpiece does not require to be machined by the machine tool 119, the processing moves to step 209. At step 203, a first transfer command signal is transferred to a sequence controller (not shown) which controls the transfer vehicle 121 and the pallet changer 123. In response to the first transfer command, the pallet located at the exit of the transfer path 110 is transferred by the transfer vehicle 121 to a position adjacent to the pallet changer 123, and then transferred into the machine tool 119 by an pallet exchange operation of the pallet changer 123.

At next step 204, it is judged whether or not the error data concerning the workpiece transferred to the machine tool 119 exist in the error data table EDT. When such data exist, the processing moves from step 204 to step 205 at which the machining cycle number is read out from the error data table EDT, and is transmitted to the numerical controller 120 at 206. In response to the transmission of the machining cycle number, the numerical controller 120 selects a numerical control program corresponding to the machining cycle number and executes it, after the workpiece is transferred to the machine tool 119, whereby the workpiece transferred to the machine tool 119 is machined in accordance with the selected numerical control program. After this operation, processing moves to step 207.

Further, when it is judged at step 204 that no error data concerning the workpiece exist in the error data table EDT, the processing moves to step 207 at which the machining cycle number of a machining cycle to be carried out by the machine tool 119 is read out from the machining variety table MVT, and the machining cycle number is transmitted to the numerical controller 120. In response to the transmission of the machining cycle number, the numerical controller 120 selects a numerical control program corresponding to the machining cycle number and executes it, after the workpiece is transferred to the machine tool 119, whereby the workpiece transferred to the machine tool 119 is machined in accordance with the selected numerical control program.

On the contrary, when it is judged at step 202 that the workpiece designated by the workpiece number does not requires to be machined by the machine tool 119, the processing moves from step 202 to step 209, at which it is judged whether or not the error data concerning the workpiece exists in the error data table EDT. When it is judged at step 209 that no error data concerning the workpiece exist in the error data table EDT, the processing end. In such case the pallet P located at the end of the transfer path 110 is directly transferred to the unloading station 6st.

When such data exist, the processing moves from step 209 to step 210 at which the pallet P located at the end of the transfer path 110 is transferred to the machine tool in the same way as mentioned above. The machining cycle number is then read out from the error data table EDT, at step 211, and is transmitted to the numerical controller 120 at 212. After this operation, processing ends.

After the completion of machining at the machine tool 119, the pallet P is transfer from the machine tool 119 to the transfer vehicle 121, and is then transferred to the unloading station 6st at which the machined workpiece is unloaded from the pallet P.

In the above mentioned machining system, workpieces which do not require special machinings are machined by single purpose machining units M1-M5. Since the single purpose machining units M1-M5 can carry out high speed machinings, the workpieces can be machined at a high speed.

In addition to that, the machining system can machine workpieces whose number is relatively small but which require special machinings which cannot be carried out by the single purpose machining units M1-M5. Since such special machinings are carried out by a single machine tool, the size of the machining system does not becomes so large as compared with the case where many number of single purpose machining units are additionally installed for carrying out the special machinings. The machining system is therefore suitable in the event that it is required to machine a large number of workpieces at a high speed, and also required to machine whose number is relatively small but which cannot be machined by the single purpose machining units M1-M5.

Further, the machining system according to the present invention has an advantage that the machining operation can be continued even when one of single purpose machining units falls in a condition that the single purpose machining unit cannot carry out its machining operation.

Obviously, numerous modifications and variations of the present invention are possible in light of the above teachings. It is therefore to be understood that within the scope of the appended claims, the present invention may be practiced otherwise than as specifically described herein.

What is claimed is:

1. A machining system comprising:
 a plurality of different kinds of single purpose machining units arranged at plural machining stations located along a transfer path;
 a general purpose machine tool capable of carrying out plural kinds of machinings which are not carried out by said single purpose machining units;
 a first transfer apparatus for transferring plural kinds of workpieces along said transfer path so as to position each of said workpieces at said plural machining stations successively so that each of said workpieces is machined by said single purpose machining units at said plural machining stations; and
 a second transfer apparatus for selectively transferring some of said workpieces requiring machinings which are not carried out by said single purpose machining units from said transfer path to said general purpose machine tool whereby said some workpieces are additionally machined by said general purpose machine tool.

2. A machining system according to claim 1, wherein said machining system further comprises a workpiece unloading station, and said second transfer apparatus is composed of conveying means for transferring said workpieces from an end of said transfer path to said general purpose machine tool and then to said unloading station, and bypass conveying means for directly transferring said workpieces from the end of said transfer path to said unloading station.

3. A machining system according to claim 1, wherein said machining system further comprises a workpiece unloading station, and said second transfer apparatus is composed of first conveying means for transferring said workpieces along a predetermined conveying path from an end of said transfer path to said unloading station and second conveying means for conveying said workpieces between a position on said conveying path and said general purpose machine tool.

4. A machining system according to claim 1, wherein said general purpose machine tool is further capable of carrying out plural kinds of machinings corresponding to machinings carried out by said single purpose machining units, respectively, and said machining system further comprises detection means for detecting the occurrence of a malfunction in one of said single purpose machining units, and control means for causing said general purpose machine tool to carry out one of plural machinings corresponding to a machining originally carried out by said one of single purpose machining units in which the malfunction occurs.

5. A machining system according to claim 4, wherein said general purpose machine tool is composed of a numerically control machine tool with a numerical controller which stores a plurality of numerical control programs corresponding to the machining cycles carried out by said single purpose machining units.

6. A machining system comprising:
 a plurality of different kinds of single purpose machining units arranged at plural machining stations located along a transfer path;
 a general purpose machine tool capable of carrying out plural kinds of machinings corresponding to machinings carried out by said single purpose machining units;
 a first transfer apparatus for transferring workpieces along said transfer path so at to position each of said workpieces at plural machining stations successively, each of said workpieces being machined by said single purpose machining units at said plural machining stations;
 a second transfer apparatus for selectively transferring some of said workpieces which can not be machined completely due to malfunction of at least one of said single purpose machining units to said general purpose machine tool so as to complete the machining on said some workpieces.

* * * * *